United States Patent [19]

Ziegenhain et al.

[11] 3,975,231

[45] Aug. 17, 1976

[54] METHOD FOR PRODUCING CONCENTRATED ALUMINA SLURRIES

[75] Inventors: William C. Ziegenhain; Bruce E. Leach; Dean O. Coleman, all of Ponca City, Okla.

[73] Assignee: Continental Oil Company, Ponca City, Okla.

[22] Filed: Aug. 18, 1975

[21] Appl. No.: 605,482

Related U.S. Application Data

[63] Continuation of Ser. No. 244,221, April 14, 1972, abandoned.

[52] U.S. Cl. ............................. 159/47 R; 423/625; 423/628; 23/293 R; 23/305 A
[51] Int. Cl.² .................. C01F 7/44; B01D 1/00
[58] Field of Search ............. 23/305 A, 300, 293 R, 23/293 A; 423/625, 628, 630, 629, 111, 112, 122, 123; 159/47 R

[56] References Cited
UNITED STATES PATENTS

| | | | |
|---|---|---|---|
| 2,796,326 | 6/1957 | Kimberlin | 423/628 |
| 2,970,892 | 2/1961 | Kirshenbaum | 23/305 A |
| 3,268,295 | 8/1966 | Armbrust | 23/305 A |
| 3,343,915 | 9/1967 | Rossi | 23/305 A |
| 3,382,040 | 5/1968 | Fuderer | 23/305 A |
| 3,384,458 | 5/1968 | McCarthy | 423/627 |
| 3,773,691 | 11/1973 | Leach | 23/305 A |
| 3,907,512 | 9/1975 | Fiegenhain et al. | 23/305 A |

OTHER PUBLICATIONS

U.S. Def. Pub., 901 O.G. 8, Aug. 1, 1972, (filed 7/21/71), Kritz et al., T901,010, 1 page 423–626.

*Primary Examiner*—Stephen J. Emery
*Attorney, Agent, or Firm*—Scottl F. Lindsey

[57] ABSTRACT

A method for producing concentrated alumina slurries containing from about 14 to about 20 weight percent $Al_2O_3$ by forming a solvent-aqueous alumina mixture and evaporating solent-aqueous vapor from said mixture to produce said concentrated alumina slurries.

7 Claims, No Drawings

1

METHOD FOR PRODUCING CONCENTRATED ALUMINA SLURRIES

This is a continuation of application Ser. No. 244,221 filed Apr. 14, 1972, now abandoned.

Field of the Invention

The present invention relates to methods for the production of alumina. The present invention further relates to methods for the production of high surface area, low bulk density, high porosity alumina. The present invention futher relates to methods for drying said alumina. The present invention further relates to methods for concentrating alumina slurries to concentrations suitable for further drying in conventional drying equipment.

Prior Art

Numerous processes such as the water hydrolysis of alumina alkoxides, the alum process and sodium aluminate processes are known for the production of alumina. Such alumina has a variety of uses such as for catalysts, catalyst supports, and the like. In many of these applications, the usefulness of the alumina is directly related to its pore volume, surface area and density. Generally, lighter alumina having a low bulk density, high surface area and high porosity is more desirable. Most processes known heretofore produce alumina having loose bulk densities greater than about 35 pounds per cubic foot (lb/ft$^3$) pore volumes of less than about 1 cc per gram (cc/g), and surface areas lower than about 275 square meters per gram (m$^2$/g). Recently a method for producing alumina having a surface area from about 260 to about 400 m$^2$/g, a pore volume of about 1 to about 2.75 cc/g and a loose bulk density of from about 7.5 to about 25 lb/ft$^3$ has been disclosed by W. C. Ziegenhain in U.S. Ser. No. 191,085 entitled "High Porosity, High Surface Area, Low Bulk Density Alumina", filed Oct. 20, 1971. The process comprises contacting aqueous alumina slurries with an effective amount of an organic solvent and drying the resulting solvent-aqueous alumina mixture. While the disclosed method is effective in the production of desirable alumina, a problem is that the large volumes of solvent and water which must be removed pose a serious problem for most conventional drying equipment. Typically, aqueous alumina filter cake contains about 15 weight percent $Al_2O_3$ and after addition of 1.5 lb of solvent per pound of aqueous alumina filter cake to form the desired solvent-aqueous alumina mixture, it is necessary to evaporate up to about 16 lb of solvent and water per lb of $Al_2O_3$ produced. As a result much time and effort has been devoted to a continuing search for improved drying methods to produce the desirable alumina product.

OBJECTS OF THE INVENTION

It is an object of the present invention to provide a method whereby solvent-aqueous alumina mixtures may be dried in a commercially-feasible manner. It is a further object of the present invention to provide a method whereby the solvent-aqueous alumina mixture may be concentrated prior to charging to conventional drying equipment. It is a further objective of the present invention to provide a method whereby the solvent-aqueous alumina mixture may be concentrated to a slurry containing a high portion of $Al_2O_3$ prior to charging to conventional drying equipment.

SUMMARY OF THE INVENTION

It has been found that the objectives of the present invention are achieved by forming a solvent-aqueous alumina mixture and evaporating solvent-aqueous vapor from said mixture to produce a concentrated alumina slurry containing from about 14 to about 20 weight percent $Al_2O_3$.

Preferred Embodiments

In the process for the production of low bulk density, high porosity, high surface area alumina by forming a solvent-aqueous alumina mixture and drying to produce desirable alumina, a preferred solvent-aqueous alumina mixture comprises a mixture of aqueous alumina filter cake containing about 15.5 weight percent $Al_2O_3$ and about 1.5 lb of organic solvent per pound of aqueous alumina filter cake. It is readily seen that to produce a product alumina containing about 70 weight percent $Al_2O_3$ it is necessary to evaporate approximately 10.3 lb of water and organic solvent per pound of product alumina. The removal of such large quantities of vapor is difficult and involves the use of drying equipment of a size such that the resulting product alumina is prohibitively expensive.

Alumina as used herein refers to an apparently dry solid containing $Al_2O_3$, water of hydration and the like. The degree of drying, etc. is shown hereinafter by the $Al_2O_3$ content of the alumina.

Heretofore numerous methods for drying aqueous alumina slurries have been available such as spray dryers, rotary drum dryers, and the like. Most such dryers were used to dry aqueous alumina filter cakes containing from about 10 to about 20 weight percent $Al_2O_3$. The use of such equipment to dry the alumina produced by the process described above is impractical since the amount of solvent removed is substantially higher than with the aqueous alumina filter cakes dried, the alumina product is degraded by the mechanical abrasion inherent in such methods, azeotropic drying is not readily achieved, it is difficult to recover the solvent and the like. As a result, the concept of evaporating solvent-aqueous vapor from the solvent-aqueous alumina mixture to form a concentrated slurry prior to charging the mixture to drying equipment was investigated. Aqueous alumina slurries containing more than about 14 weight percent $Al_2O_3$ are typically non-free flowing semisolid mixtures. Such mixtures are oftentimes referred to as slurries as a general term encompassing water-alumina mixtures generally. Such mixtures as noted are not free flowing slurries above an $Al_2O_3$ content of about 14 weight percent. It has now been found that when a solvent-aqueous alumina mixture is concentrated by evaporation, the evaporation may be continued to produce an alumina slurry containing from about 14 to about 20 weight percent $Al_2O_3$ which is a free flowing slurry, although a preferred range is from about 14.5 to about 16.5 weight percent $Al_2O_3$. The organic solvent is selected from the group consisting of organic alcohols containing from about 1 to about 4 carbon atoms. Some specific examples of such alcohols are ethanol, propanol, isopropanol, n-butanol, isobutanol and tertiary butanol. Preferred alcohols are ethanol and butanol since both are often present in the processes wherein the alumina is produced. The $Al_2O_3$ content in the respective slurries is significant in that heretofore evaporation of aqueous alumina mixtures to produce an aqueous-alumina slurry could be continued to the point of producing an alumina slurry containing up to about 14 weight percent $Al_2O_3$ and still remain a free flowing slurry, whereas by the method of the present invention, it is possible to continue to evaporate to an $Al_2O_3$ content of up to about 20 weight percent $Al_2O_3$ while still retaining a free flowing slurry. Thus, it is possible to increase the $Al_2O_3$ content of the slurry by approximately 30 percent while retaining a free flowing slurry for charging to subsequent drying steps in conventional drying equipment.

THe concentrated slurries are produced by using as a starting composition a mixture containing alumina, water and solvent on a ratio which upon evaporation to $Al_2O_3$ contents of from about 14 to about 20 weight percent will result in slurries containing from about 15 to about 70 weight percent water with the balance being solvent and alumina. The composition of the product slurry is variable dependent upon the desired properties in the product alumina, i.e. higher solvent contents result in lower density alumina products. A preferred product slurry composition is from about 14 to about 20 weight percent $Al_2O_3$ and from about 19 to about 55 weight percent water with the balance being solvent. The preferred compositions roughly correspond to the ranges necessary to produce a product alumina having a loose bulk density from about 10 to about 20 $lb/ft^3$ when n-butanol is used as the solvent. The starting mixture can vary widely as a result of prior processing operations, etc and since the calculation of such starting mixture composition is well known to those skilled in the art, such starting composition need not be defined further except to note that typically the evaporation is carried out azeotropically. Information as to azeotropic mixtures of the preferred solvents is given below.

| *Solvent | Azeotropic Mixtures Wt % Solvent | Wt % Water | B.P. (°C) |
| --- | --- | --- | --- |
| Ethanol | 95.5 | 4.5 | 78.1 |
| Propanol | 71.7 | 28.3 | 87.7 |
| Isopropanol | 87.9 | 12.1 | 80.4 |
| N-Butanol | 62.0 | 38.0 | 92.4 |
| Isobutanol | 66.8 | 33.2 | 90.0 |
| Tertiary Butanol | 88.3 | 11.7 | 79.9 |

*Langes Handbook of Chemistry, Ninth Edition, pp 1484–1485

Starting compositions useful in the method of the present invention comprise from about 1 to about 15 weight percent $Al_2O_3$, from about 20 to about 90 weight percent solvent and from about 15 to about 65 weight percent water.

It is difficult to obtain free flowing solvent-aqueous alumina slurries containing more than about 17 weight percent $Al_2O_3$ unless a mild shear is imparted to the slurry. When mild shear is imparted to the solution during evaporation, free flowing solvent-aqueous alumina slurries containing up to about 20 weight percent $Al_2O_3$ can be obtained.

It has been found that the solvent-aqueous alumina mixtures of the present invention possess at least some of the properties of thixotropic mixtures generally and in particular it has been found that imparting mild shearing action serves to reduce the viscosity of the solvent-aqueous alumina mixtures. It is readily seen that the viscosity reduction serves to produce a more easily handled mixture and allows further concentration of the mixtures. Substantial viscosity reductions are obtained up to shear rates of about 10,000 reciprocal seconds ($sec^{-1}$). The design of evaporator equipment capable of imparting such shear is well known in the art and will not be discussed further. It is pointed out that at higher shear rates the viscosity has been observed to increase. The theoretical reasons for such thickening are not fully understood and the limitations as to the maximum amount of shear allowable are no clearly defined. While the values stated may not be optimum, substantial viscosity reductions have been obtained at such values and further viscosity reductions may be obtained at higher shear rates up to the point at which the mixture begins to thicken, i.e. the viscosity begins to increase. Very desirable results have been obtained when shear values from about 10 to about 1000 $sec^{-1}$ were used.

As a further modification of the present invention it is known that when solvent-aqueous alumina mixtures are evaporated at reduced pressures the solvent-water azeotrope composition is modified. In particular it has been discovered that at reduced pressures the azeotropic compositions tend to be richer in water. As will readily be seen the amount of solvent necessary to remove a given amount of water azeotropically is reduced as the azeotropic composition increases in water content. Accordingly, the amount of solvent required to azeotropically remove the water from an aqueous alumina slurry is reduced by evaporating the solvent-water vapors at reduced pressures. Particularly desirable results have been achieved wherein n-butanol was used as the organic solvent.

The method of the present invention can be utilized to produce alumina slurries containing up to about 20 weight percent $Al_2O_3$ by evaporating the solvent-water vapor to produce said slurries or the evaporation can be carried out under reduced pressure with or without the imparting of shear into the mixture. The choice of operating conditions will be dependent upon economic factors, available equipment, the objectives of the user and the like. The advantages realized from each modification can obviously be realized in combination or separately. In particular, the addition of mild shearing action is beneficial in realizing reduced viscosities at high $Al_2O_3$ contents whereas the use of reduced pressure may be less desirable for economic reasons than the use of increased quantities of solvent.

Commercially available evaporating equipment will be found useful in the process of the present invention so long as such equipment maintains solution agitation, avoids locally overconcentrating the solvent-aqueous alumina mixture and is adapted to the removal of vapors generally from mixtures containing volatile material. Likewise, conventional drying equipment will be found useful in further drying the produced slurry to produce the dried alumina product. Such equipment is well known to those skilled in the art and will not be discussed further.

Many modifications or variations are possible within the scope of the present invention and may appear obvious or desirable to those skilled in the art based upon the foregoing description of preferred embodiments and the following examples and claims.

EXAMPLES

All viscosities were determined on a Fann viscometer, Model Number 35, manufactured by the Fann Instrument Corporation, Houston, Tex.

EXAMPLE I

A sample of aqueous alumina slurry containing alumina produced by the water hydrolysis of aluminum alkoxides produced by the Ziegler process was prepared. The slurry composition was 10.0 weight percent $Al_2O_3$, 82.1 weight percent water and 7.8 weight percent butanol with the balance comprising trace amounts of organic alcohols containing up to about 24 carbon atoms. The slurry was concentrated by evaporation to an $Al_2O_3$ content of about 14 weight percent $Al_2O_3$. The viscosity data obtained at shear rates of 100 $sec^{-1}$ is shown in Table I below. Above about 13 weight percent $Al_2O_3$ the aqueous alumina mixture was a non-free flowing semi-solid material.

Table I

| $Al_2O_3$ Content wt % | Water Content wt % | Butanol Content wt % | Viscosity (cp) |
|---|---|---|---|
| 10 | 82.2 | 7.8 | 80 |
| 11 | | | 125 |
| 12 | | | 188 |
| 13 | 84.6[1] | 2.4[1] | 300 |
| 14 | 84.0[1] | 2.0[1] | [2] |

[1] Calculated values
[2] Non-free flowing semi-solid mixture

EXAMPLE II

A sample of aqueous alumina slurry similar to that in Example I was mixed with n-butanol to give a starting solvent-aqueous alumina slurry containing 3.7 weight percent $Al_2O_3$, 33.6 weight percent water and 66.7 weight percent n-butanol with the balance comprising trace amounts of organic alcohols containing up to about 24 carbon atoms. The slurry was concentrated by evaporation to about 16.5 weight percent $Al_2O_3$. The viscosity data obtained at a shear rate of 100 $sec^{-1}$ is shown in Table II below as a function of $Al_2O_3$ concentration. The mixture was a free flowing slurry at an $Al_2O_3$ concentration of 16.5 weight percent.

Table II

| $Al_2O_3$ Content wt % | Water Content wt % | Butanol Content wt % | Viscosity (cp) |
|---|---|---|---|
| 11.12 | 24.8[1] | 64.0[1] | 113 |
| 12.88 | | | 200 |
| 14 | | | 210 |
| 15.2 | | | 240 |
| 16.14 | | | 460 |
| 16.4 | 18.9[1] | 64.7[1] | 790 |

[1] Calculated values

It is readily seen that a substantial improvement in concentrating the $Al_2O_3$ in a free flowing slurry form has been achieved by the addition of solvent prior to evaporation.

EXAMPLE III

A solvent-aqueous alumina slurry containing 15.1 weight percent $Al_2O_3$ and about 28 weight percent water with the balance being n-butanol was prepared as in Example II and placed in a Fann Viscometer, Model No. 35 manufactured by the Fann Instrument Corporation, Houston, Texas, for determination of the effects of shear upon the viscosity. The results obtained are shown in Table III below. Clearly the imparting of shear results in substantial viscosity reductions within the ranges tested.

Table III

| $Al_2O_3$ Content wt % | Shear Rate ($sec^{-1}$) | Viscosity (cp) |
|---|---|---|
| 15.1 | 5 | 1770 |
| 15.1 | 10 | 1020 |
| 15.1 | 170 | 185 |
| 15.1 | 340 | 145 |
| 15.1 | 500 | 135 |
| 15.1 | 1050 | 112 |

EXAMPLE IV

A mixture containing 1000 g distilled water and 2000 g n-butanol was placed in a flask and evaporated at varying pressures by heating the flask. The test results are summarized below in Table IV.

Table IV

| Absolute Pressure (mm Hg) | Boiling Point (°C) | Azeotrope Composition (wt % $H_2O$) |
|---|---|---|
| 760 | 92 | 42.7 |
| 760 | 92 | 42.3 |
| 300 | 70 | 44.5 |
| 300 | 71 | 44.3 |
| 200 | 61 | 45.9 |
| 100 | 47 | 48.5 |
| 50 | 37 | 50.7 |

The effectiveness of the pressure reduction in decreasing the amounts of solvent required are illustrated by the summary shown below in Table IVA setting out the n-butanol requirement to azeotropically remove 1000 lb of water at various pressures.

Table IVA

| Absolute Pressure (mm Hg) | Vapor Temperature (°C) | N-butanol Requirement (lb n-butanol/1000 lb $H_2O$) |
|---|---|---|
| 760 | 92 | 1353 |
| 300 | 70 | 1252 |
| 200 | 61 | 1179 |
| 100 | 47 | 1062 |
| 50 | 37 | 972 |

It is noted that at 50 mm Hg 28.2% less n-butanol is required to azeotropically remove 1000 lb of water than at atmospheric pressure.

EXAMPLE V

A solvent-aqueous alumina slurry containing 6 weight percent $Al_2O_3$, 51.3 weight percent water and 42.7 weight percent butanol was concentrated by azeotropic distillation at atmospheric pressure in a vessel equipped with an agitation system which imparts mild shear to the slurry during evaporation. The slurry was concentrated to 19.1 weight percent $Al_2O_3$, 27.4 weight percent butanol and 53.5 weight percent water. The concentrated slurry is free flowing to the extent that it flowed readily from the vessel through a 0.5 inch opening. It would not flow through a 0.125 inch opening. Upon removal of the shearing action the material became a non-free flowing semi-solid material.

The effect of shearing action in preparing free flowing concentrated alumina slurries is clearly shown.

Having thus described the invention we claim:

1. A method for producing free flowing concentrated alumina slurries from aqueous alumina slurries said method consisting of:

a. adding a liquid solvent to an aqueous alumina slurry to form a slurry mixture, said solvent being selected from the group consisting of ethanol, propanol, isopropanol, n-butanol, isobutanol and tertiary butanol; and b. azeotropically evaporating solvent-aqueous vapor to produce a concentrated alumina slurry consisting essentially of from about 14 to about 17 weight percent $Al_2O_3$, from about 15 to about 70 weight percent water and from about 70 to about 13 weight percent solvent.

2. The method of claim 1 wherein said concentrated alumina slurry contains from about 14.5 to about 16.5 weight percent $Al_2O_3$.

3. The method of claim 1 wherein said solvent is evaporated azeotropically at reduced pressures.

4. The method of claim 1 wherein said solvent in said solvent-aqueous alumina mixture is n-butanol and said concentrated alumina slurry contains from about 19 to about 55 weight percent water, from about 14.5 to about 16.5 weight percent $Al_2O_3$ and from about 66.5 to about 28.5 weight percent n-butanol.

5. A method for producing free flowing concentrated alumina slurries from aqueous alumina slurries said method consisting of:

a. adding a liquid solvent to an aqueous alumina slurry to for a slurry mixture, said solvent being selected from the group consisting of ethanol, propanol, isopropanol, n-butanol, isobutanol and tertiary butanol; and b. subjecting the solvent-aqueous alumina mixture to mild shear at rates from about 10 to about 10,000 $sec^{-1}$ and simultaneously azeotropically evaporating solvent-aqueous vapor to produce a concentrated alumina slurry consisting essentially of from about 14 to about 20 weight percent $Al_2O_3$, from about 15 to about 70 weight percent water and from about 71 to about 10 weight percent solvent.

6. The method of claim 5 wherein said shear is imparted at a rate from about 100 to about 1000 $sec^{-1}$.

7. The method of claim 6 wherein said solvent-aqueous vapor is evaporated azeotropically at absolute pressures from about 50 mm Hg to about 760 mm Hg and said solvent is n-butanol.

* * * * *